US012793548B2

(12) United States Patent
Suzuki et al.

(10) Patent No.: US 12,793,548 B2
(45) Date of Patent: Nov. 10, 2026

(54) PARKING ASSISTANCE METHOD AND PARKING ASSISTANCE DEVICE

(71) Applicant: Nissan Motor Co., Ltd., Yokohama (JP)

(72) Inventors: Yasuhiro Suzuki, Kanagawa (JP); Manato Matsumoto, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 19/150,331

(22) PCT Filed: Jan. 27, 2023

(86) PCT No.: PCT/JP2023/002663
§ 371 (c)(1),
(2) Date: Jul. 23, 2025

(87) PCT Pub. No.: WO2024/157460
PCT Pub. Date: Aug. 2, 2024

(65) Prior Publication Data
US 2026/0229120 A1 Aug. 6, 2026

(51) Int. Cl.

| | |
|---|---|
| ***G08G 1/14*** | (2006.01) |
| ***B60W 30/06*** | (2006.01) |
| ***B62D 15/02*** | (2006.01) |
| ***G01S 19/14*** | (2010.01) |
| ***G01S 19/39*** | (2010.01) |

(Continued)

(52) U.S. Cl.
CPC ............ *G08G 1/143* (2013.01); *B60W 30/06* (2013.01); *B62D 15/0285* (2013.01); *G01S 19/14* (2013.01); *G01S 19/396* (2019.08); *G01S 19/42* (2013.01); *G08G 1/168* (2013.01)

(58) Field of Classification Search
CPC ....... G08G 1/143; G08G 1/168; B60W 30/06; G01S 19/396; G06V 20/586; B62D 15/0285
See application file for complete search history.

(56) References Cited

U.S. PATENT DOCUMENTS 7,970,535 B2 * 6/2011 Katoh ................ B62D 15/0285 348/119
10,586,457 B2 * 3/2020 Boss ...................... G08G 1/168
10,852,153 B2 * 12/2020 Yun .................... B62D 15/0285
(Continued)

FOREIGN PATENT DOCUMENTS

JP 2022-133230 A 9/2022

*Primary Examiner* — John A Tweel, Jr.
(74) *Attorney, Agent, or Firm* — Young Basile Hanlon & MacFarlane, P.C.

(57) ABSTRACT

A parking assistance method includes: acquiring, from a storage device, the storage device storing, when parking is performed in advance, information about a parking position when parking is performed and information about a maneuvering position, the maneuvering position being a position at which when a vehicle is parked at the parking position, the vehicle changes its direction of travel back and forth, information about the parking position and the maneuvering position; detecting a self-position, the self-position being a current position of an own vehicle; and informing, based on at least the maneuvering position and the self-position, a user of the own vehicle of the parking position as a target parking position candidate.

9 Claims, 5 Drawing Sheets

(51) Int. Cl.
*G01S 19/42* (2010.01)
*G08G 1/16* (2006.01)

(56) References Cited

U.S. PATENT DOCUMENTS

| | | | | |
|---|---|---|---|---|
| 10,937,256 | B2 * | 3/2021 | Nakamura | G06V 20/56 |
| 11,724,741 | B2 * | 8/2023 | Lee | B60T 7/22<br>701/428 |
| 12,415,505 | B2 * | 9/2025 | Suzuki | B60W 30/06 |
| 12,579,893 | B2 * | 3/2026 | Hamaguchi | G08G 1/16 |
| 2020/0148222 | A1 * | 5/2020 | Yamamoto | B60R 1/27 |
| 2022/0274586 | A1 | 9/2022 | Tokuhiro et al. | |
| 2025/0050869 | A1 | 2/2025 | Tokuhiro et al. | |
| 2025/0050870 | A1 | 2/2025 | Tokuhiro et al. | |
| 2025/0136095 | A1 | 5/2025 | Tokuhiro et al. | |

* cited by examiner

PARKING ASSISTANCE METHOD AND PARKING ASSISTANCE DEVICE

TECHNICAL FIELD

The present invention relates to a parking assistance method and a parking assistance device.

BACKGROUND

In JP 2022-133230 A described below, a parking assistance device configured to store a parking target position in parking operation performed in the past and inform a target position that allows autonomous travel of a vehicle to the target parking position to be performed is described.

SUMMARY

However, in the parking assistance device in JP 2022-133230 A described above, when a plurality of pre-stored parking target positions exist, a user needs to select a parking target position to be informed.

An object of the present invention is to save, when guidance of a pre-stored parking target position is presented to a user, labor in selection operation of a parking target position by the user.

A parking assistance method according to one aspect of the present invention includes: acquiring, from a storage device, the storage device storing, when parking is performed in advance, information about a parking position when parking is performed and information about a maneuvering position, the maneuvering position being a position at which when a vehicle is parked at the parking position, the vehicle changes its direction of travel back and forth, information about the parking position and the maneuvering position; detecting a self-position, the self-position being a current position of an own vehicle; and informing, based on at least the maneuvering position and the self-position, a user of the own vehicle of the parking position as a target parking position candidate.

According to the present invention, it is possible to save, when guidance of a pre-stored parking target position is presented to a user, labor in selection operation of a parking target position by the user.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

First Embodiment (Configuration)

Figure 1:
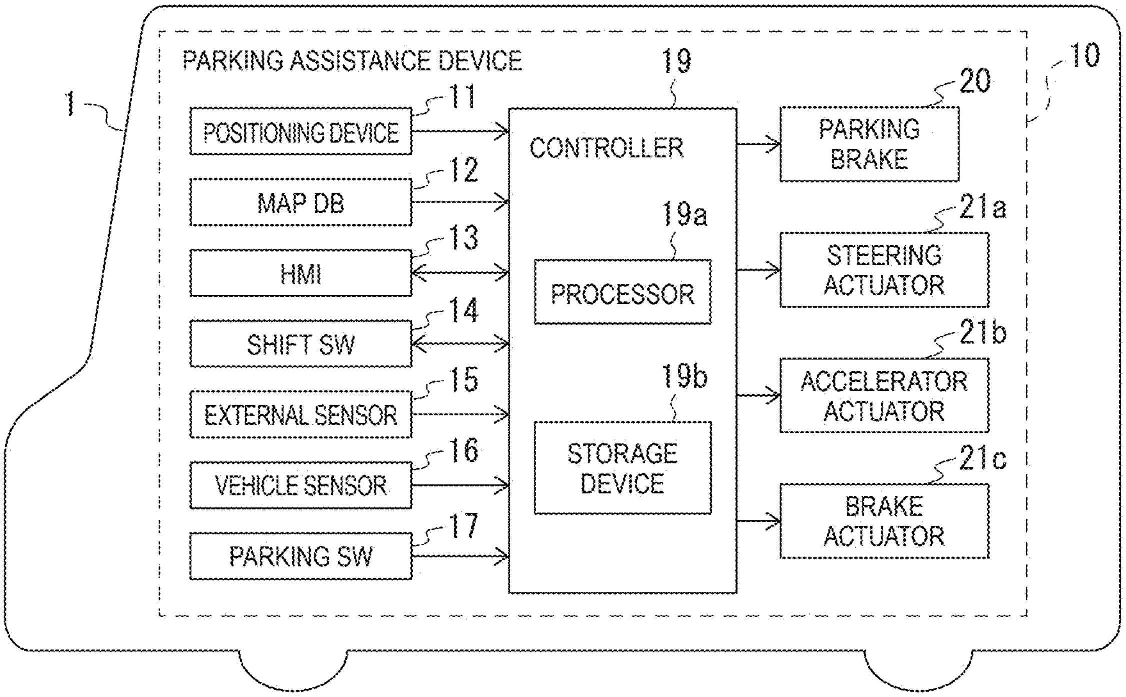
FIG. 1 is a diagram illustrative of a schematic configuration example of a parking assistance device of embodiments.

FIG. 1 is a diagram illustrative of a schematic configuration example of a parking assistance device of embodiments. An own vehicle 1 includes a parking assistance device 10 configured to assist parking of the own vehicle 1 at a target parking position. The parking assistance device 10 assists the own vehicle 1 in traveling along a target parking route from a current position of the own vehicle 1 to the target parking position. For example, the driving assistance device 10 may perform autonomous driving to control the own vehicle 1 to travel to the target parking position along the target parking route of the own vehicle 1. The autonomous driving to control the own vehicle 1 to travel to the target parking position along the target parking route means control to automatically perform all or a portion of travel along the target parking route of the own vehicle 1 by controlling all or some of a steering angle, driving force, and braking force of the own vehicle 1. Alternatively, the parking assistance device 10 may assist a user on board the own vehicle 1 (for example, a passenger such as a driver) in parking the own vehicle 1 by displaying the target parking route and the current position of the own vehicle 1 on a display device that the user can visually recognize.

A positioning device 11 measures the current position of the own vehicle 1. The positioning device 11 includes, for example, a global navigation satellite system (GNSS) receiver. For example, the GNSS receiver may be a global positioning system (GPS) receiver or the like. In a map database (map DB) 12, map data are stored. The map data stored in the map database 12 may be, for example, map data for navigation or high-definition map data that is suitable as a map for autonomous driving.

Human-machine interfaces (HMIs) 13 are interface devices that transfer information between the parking assistance device 10 and the user. For example, the HMIs 13 may include a display device that the user can visually recognize, as an interface presenting visual information to the user. In addition, the HMIs 13 may include a speaker or a buzzer as an interface presenting auditory information to the user. In addition, the HMIs 13 may include an interface (such as a touch panel, a button, a switch, a lever, a dial, and a keyboard) accepting an operation input from the user.

A shift switch (shift SW) 14 is a switch for the driver or the parking assistance device 10 to switch a shift position of the own vehicle 1.

External sensors 15 detect an object existing in a predetermined distance range from the own vehicle 1. The external sensors 15 detect a surrounding environment of the own vehicle 1, such as a relative position between an object existing in surroundings of the own vehicle 1 and the own vehicle 1, distance between the own vehicle 1 and the object, and a direction in which the object exists. The external sensors 15 may include, for example, a camera to capture an image depicting the surrounding environment of the own vehicle 1. The external sensors 15 may include a ranging device, such as a laser range finder, a radar, a light detection and ranging (LiDAR), and a sonar. Vehicle sensors 16 detect various information (vehicle information) about the own vehicle 1. For example, the vehicle sensors 16 may include a vehicle speed sensor to detect traveling speed of the own vehicle 1, a triaxial acceleration sensor to detect acceleration (including deceleration) in three axial directions of the own vehicle 1, and a sensor to detect a steering angle of a steering wheel or a steered angle of steered wheels.

A parking switch (parking SW) 17 is a switch to start parking assistance control performed by the parking assistance device 10.

A controller 19 is an electronic control unit that performs parking assistance control of the own vehicle 1. The controller 19 includes a processor 19*a* and a peripheral component, such as a storage device 19*b*. The processor 19*a* may be, for example, a CPU or an MPU. The storage device 19*b* may include a semiconductor storage device, a magnetic storage device, an optical storage device, or the like. Functions of the controller 19, which will be described below, are achieved by, for example, the processor 19*a* executing computer programs stored in the storage device 19*b*.

A parking brake 20 generates friction braking force on wheels of the own vehicle 1 in accordance with operation by the user or a control signal from the controller 19.

A steering actuator 21*a* controls steering direction and the amount of steering of a steering mechanism of the own vehicle 1 in accordance with a control signal from the controller 19. An accelerator actuator 21*b* controls accelerator opening of a drive device, which is an engine or a drive motor, in accordance with a control signal from the controller 19. A brake actuator 21*c* causes a braking device to operate in accordance with a control signal from the controller 19.

Next, the parking assistance control performed by the controller 19 will be described. The controller 19 executes parking assistance control that assists parking at a pre-registered target parking position. The target parking position is stored (registered) in a specific storage device in advance before execution of the parking assistance of the own vehicle 1.

Figure 2A:
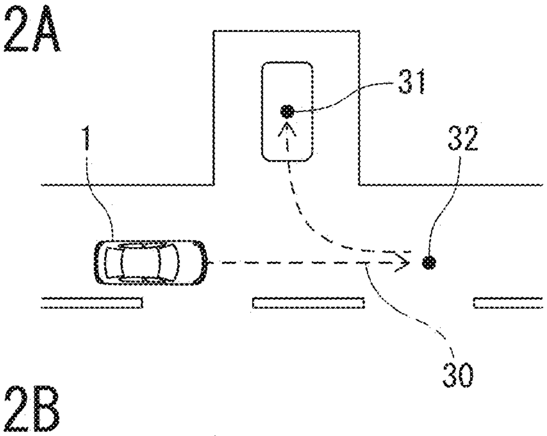
FIG. 2A is a schematic diagram of a scene in which a target parking position is registered.

FIG. 2A is a schematic diagram of a scene in which a target parking position is registered. At the time of registering the target parking position, the user parks a vehicle (in the example in FIG. 2A, the own vehicle 1) at the target parking position by manual driving. In FIG. 2A, a dashed line 30 indicates a parking trajectory when the own vehicle 1 is actually parked at a parking position 31 by manual driving, and a reference sign 32 indicates a maneuvering position that is a position at which the own vehicle 1 is maneuvered back and forth on the parking trajectory 30. Note that "maneuvering back and forth" refers to operation of changing the shift position of a vehicle from a forward travel position to a reverse travel position. For example, the controller 19 may detect occurrence of maneuvering back and forth, based on change in a state of the shift switch 14. The controller 19 may acquire a position of the own vehicle 1 measured by the positioning device 11 at the occurrence of maneuvering back and forth as a maneuvering position 32. In addition, the controller 19 may acquire a position of the own vehicle 1 measured by the positioning device 11 at a time point when parking driving of the own vehicle 1 by manual driving is completed as the parking position 31. For example, the controller 19 may determine that the parking driving is completed when the shift position of the vehicle is changed to a parking range (P). The controller 19 registers the parking position 31 and the maneuvering position 32 by storing the parking position 31 and the maneuvering position 32 in a coordinate system with a fixed point as a reference point (hereinafter, referred to as "map coordinate system") in association with each other in a specific storage device.

The specific storage device that stores the parking position 31 and the maneuvering position 32 may be, for example, the storage device 19*b* or a storage device external to the own vehicle 1 (for example, a cloud computer). For example, the parking position 31 and the maneuvering position 32 acquired when another vehicle, which is different from the own vehicle 1, is parked at the parking position 31 by manual driving may be stored in a storage device installed at a location external to the own vehicle 1 and the another vehicle. The own vehicle 1 may receive the parking position 31 and the maneuvering position 32 stored in the external storage device via a communication device and make use of the received parking position 31 and maneuvering position 32 for parking assistance of the own vehicle 1. In the following description, a case of registering the parking position 31 and the maneuvering position 32 in the storage device 19*b* is described as an example.

Figure 2B:
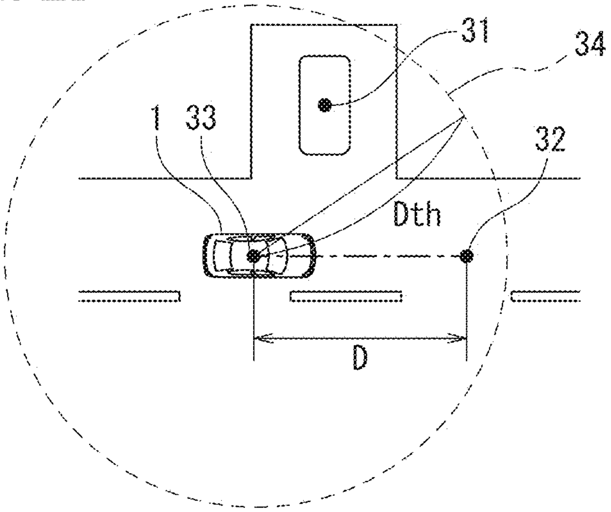
FIG. 2B is a schematic diagram of a scene in which parking assistance at the target parking position is executed.

FIG. 2B is now referred to. When executing the parking assistance to assist parking at the parking position 31 as the target parking position, the controller 19 acquires the pre-registered parking position 31 and maneuvering position 32 from the storage device 19*b*. In addition, the controller 19 detects a self-position 33 that is the current position of the own vehicle 1 by the positioning device 11. The controller 19 presents, based on the maneuvering position 32 and the self-position 33, guidance relating to the parking position 31 to the user as a target parking position candidate. For example, when the maneuvering position 32 is located within a predetermined range 34 in surroundings of the self-position 33, the controller 19 may present the guidance relating to the parking position 31 that is stored in association with the maneuvering position 32 to the user. For example, when distance D between the self-position 33 and the maneuvering position 32 is less than or equal to a distance threshold value Dth, the controller 19 may present the guidance relating to the parking position 31 to the user.

Note that the controller 19 may present, based on the parking position 31 and the self-position 33, the guidance relating to the parking position 31 to the user. For example, when the parking position 31 is located within the predetermined range 34 in the surroundings of the self-position 33, the controller 19 may present the guidance relating to the parking position 31 to the user. In addition, the controller 19 may present, based on the parking position 31, the maneuvering position 32, and the self-position 33, the guidance relating to the parking position 31 to the user. For example, when any position on a line segment connecting the parking position 31 and the maneuvering position 32 exists within the predetermined range 34 in the surroundings of the self-position 33, the controller 19 may present the guidance relating to the parking position 31 to the user. For example, when a middle point between the parking position 31 and the maneuvering position 32 exists within the predetermined range 34 in the surroundings of the self-position 33, the controller 19 may present the guidance relating to the parking position 31 to the user. When there are a plurality of parking positions 31 that satisfy the above-described conditions, the controller 19 may inform all the parking positions 31 satisfying the conditions, inform the parking positions 31 in order of proximity to the self-position 33, or inform only a parking position 31 that is closest to the self-position 33.

Figure 3:
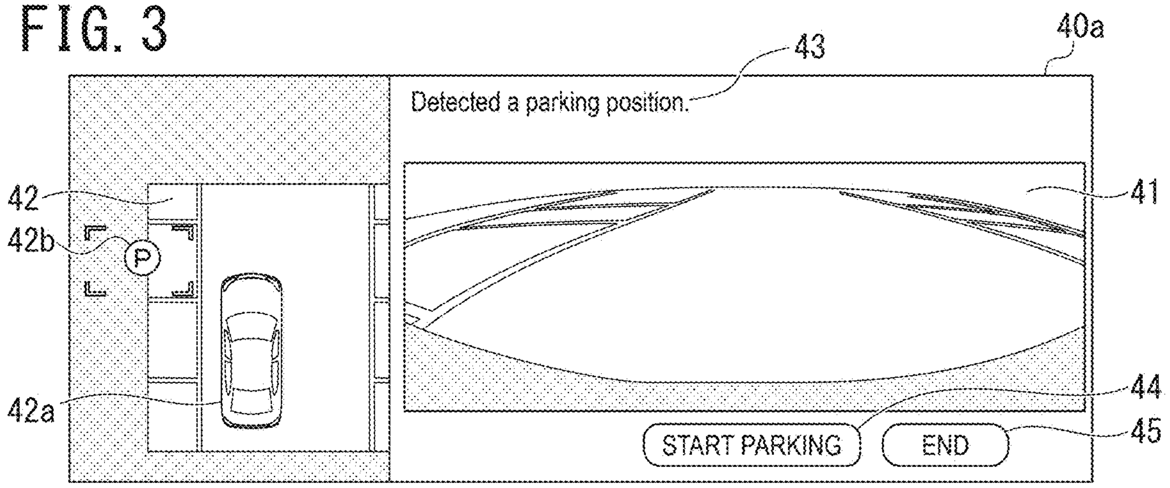
FIG. 3 is a schematic diagram of an example of a first guidance screen.

For example, the controller 19 may display a first guidance screen that presents the parking position 31 to the user, on the display device in the HMIs 13 as the guidance relating to the parking position 31. FIG. 3 is a schematic diagram of an example of the first guidance screen. A first guidance screen 40*a* includes a captured image 41 generated by capturing the surroundings of the own vehicle 1, an overhead view image 42 generated by converting captured images of the surroundings of the own vehicle 1, a message display area 43 in which a notification such as a visual message is displayed, a parking start button 44, and an end button 45. When the user operates the parking start button 44 or the end button 45 displayed on the display device, a touch panel provided on the display device detects such an operation.

Figure 8:
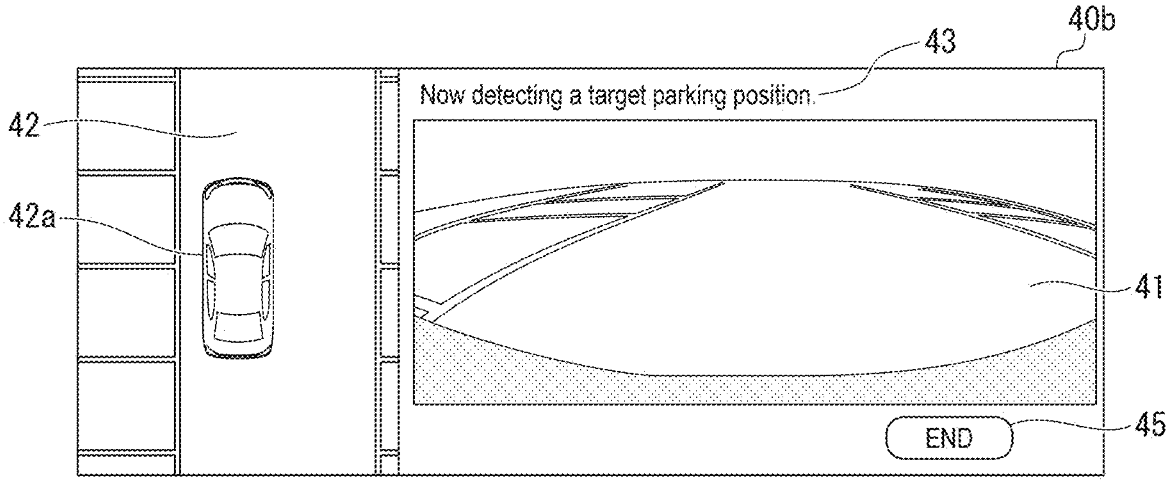
FIG. 8 is a schematic diagram of an example of a second guidance screen.

In the overhead view image 42, an icon 42*a* representing the current position of the own vehicle 1 and a target parking position mark 42*b* representing the parking position 31 are displayed in a superimposing manner. In the message display area 43 of the first guidance screen 40*a*, the controller 19 may display, for example, a notification, such as a visual message, that notifies the user that the controller 19 has detected the parking position 31. When the end button 45 is operated, the controller 19 suspends the parking assistance control. The same applies to a case where an end button 45 in a second guidance screen 40*b*, which will be described later, illustrated in FIG. 8 is operated. When the parking start button 44 is operated, the controller 19 sets the parking position 31 as the target parking position and starts the assistance in parking of the own vehicle 1 at the target parking position.

On the other hand, when no maneuvering position 32 is located within the predetermined range 34 in the surroundings of the self-position 33, the controller 19 does not present the guidance relating to the parking position 31 to the user.

(Operation)

Figure 4:
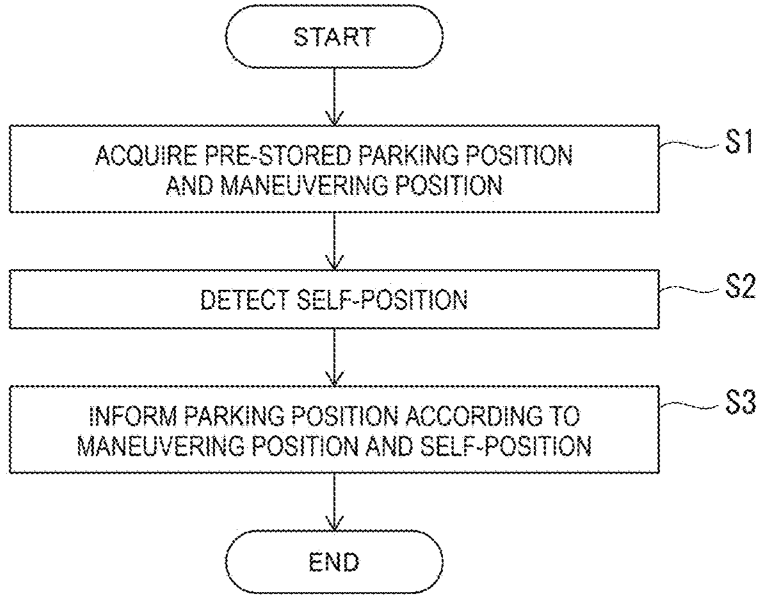
FIG. 4 is a flowchart of a parking assistance method of a first embodiment.

FIG. 4 is a flowchart of a parking assistance method of a first embodiment. In step S1, the controller 19 acquires a pre-registered parking position 31 and maneuvering position 32 from the storage device 19*b*. In step S2, the controller 19 detects a self-position 33. In step S3, the controller 19 informs, based on the maneuvering position 32 and the self-position 33, the user of the parking position 31 as a target parking position candidate.

Second Embodiment

A controller 19 of a second embodiment learns and registers a target object existing in surroundings of a parking position 31 as a "learned target object" in advance. When assisting parking of an own vehicle 1, the controller 19 detects a relative position of the parking position 31 with respect to the own vehicle 1 by matching a target object detected in surroundings of the own vehicle 1 with a learned target object. In the following description, a target object detected in the surroundings of the own vehicle 1 and matched with a learned target object at the time of parking assistance is sometimes referred to as "surrounding target object".

Figure 5A:
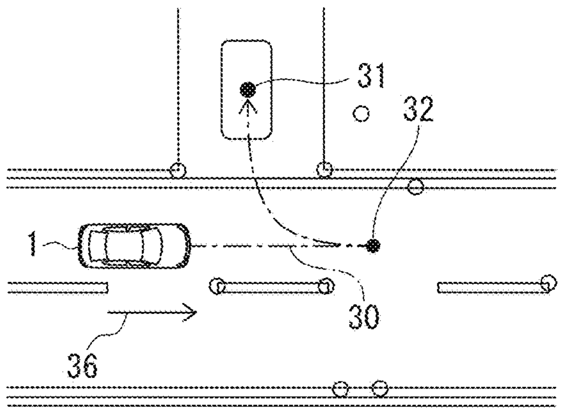
FIGS. 5A and 5B are schematic diagrams descriptive of an example of a detection method of a parking position using a learned target object.
Figure 5B:
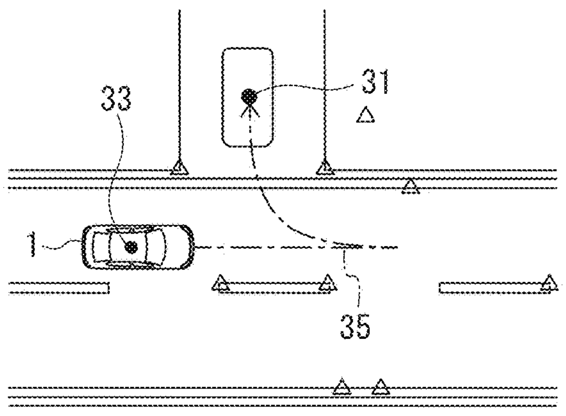

FIGS. 5A and 5B are schematic diagrams descriptive of an example of a detection method of the parking position 31 using a learned target object. At the time of registering the parking position 31, the controller 19 extracts a target object existing in the surroundings of the parking position 31 and stores (registers) the extracted target object in a storage device 19*b* as a learned target object in advance. For example, as illustrated in FIG. 5A, a user causes the own vehicle 1 to travel along a parking route 30 by manual driving and parks the own vehicle 1 at the parking position 31, and on this occasion, the controller 19 detects a target object existing in the surroundings of the own vehicle 1 by external sensors 15 and stores the detected target object as a learned target object. Circular marks schematically represent learned target objects. Note that FIG. 5A illustrates, as a parking route 30 along which, when the parking position 31 is registered, the own vehicle 1 travels to the parking position 31 by manual driving, an example of a route along which the own vehicle 1 moves forward in the direction of an arrow 36, comes close to the maneuvering position 32, and after reaching the maneuvering position 32, reaches the parking position 31 in reverse travel.

For example, the controller 19 may store a relative position of a learned target object with reference to the parking position 31. The controller 19 can acquire a position of a learned target object detected when the own vehicle 1 is parked at the parking position 31 as a relative position of the learned target object with reference to the parking position 31. The controller 19 may store coordinates of a learned target object and the parking position 31 in a map coordinate system. The controller 19 stores learned target object data relating to a learned target object in the storage device 19*b*. For example, the learned target object data may include data representing a feature amount of a learned target object (hereinafter, referred to as "feature amount data"), data representing a relative positional relationship between the parking position 31 and the learned target object (hereinafter, referred to as "relative position data"), and position data of the parking position 31 in the map coordinate system. The controller 19 may store, for example, a relative position of a learned target object with reference to the parking position 31 as the relative position data. For example, the controller 19 can acquire a position of a learned target object detected when the own vehicle 1 is parked at the parking position 31 as the relative position of the learned target object with reference to the parking position 31. The controller 19 may store coordinates of a learned target object and the parking position 31 in the map coordinate system.

FIG. 5B is now referred to. When the controller 19 assists parking of the own vehicle 1 at the parking position 31, the controller 19 extracts a target object in the surroundings of the own vehicle 1 as a surrounding target object by the external sensors 15. Triangular marks represent surrounding target objects. The controller 19 detects the parking position 31 existing in the surroundings of the own vehicle 1 by matching a learned target object and a surrounding target object with each other and associating the same feature points with each other. The controller 19 calculates a relative position of the own vehicle 1 with respect to the parking position 31, based on a relative positional relationship between a surrounding target object detected when the parking assistance is performed and the own vehicle 1 and a relative positional relationship between a learned target object associated with the surrounding target object and the parking position 31. For example, the controller 19 calculates a position of the parking position 31 in a coordinate system with reference to the current position of the own vehicle 1 (hereinafter, referred to as "vehicle coordinate system"). Note that when coordinates of the learned target object and the parking position 31 in the map coordinate system are stored in the storage device 19*b*, the controller 19 may convert the coordinates of the parking position 31 in the map coordinate system to coordinates in the vehicle coordinate system, based on the position of the surrounding target object detected when the parking assistance is performed and the position of the learned target object in the map coordinate system. The controller 19 may calculate a self-position 33 of the own vehicle 1 in the map coordinate system, based on the position of the surrounding target object detected when the parking assistance is performed and the position of the learned target object in the map coordinate system, and calculate the relative position of the own vehicle 1 with respect to the parking position 31 from a difference between the coordinates of the own vehicle 1 and the coordinates of the parking position 31 in the map coordinate system. Subsequently, the controller 19 calculates a target parking route 35 starting from the self-position 33 of the own vehicle 1 and reaching the parking position 31. When the parking position 31 is set as the target parking position, the controller 19 performs the parking assistance control of the own vehicle 1, based on the calculated target parking route 35.

Figure 6:
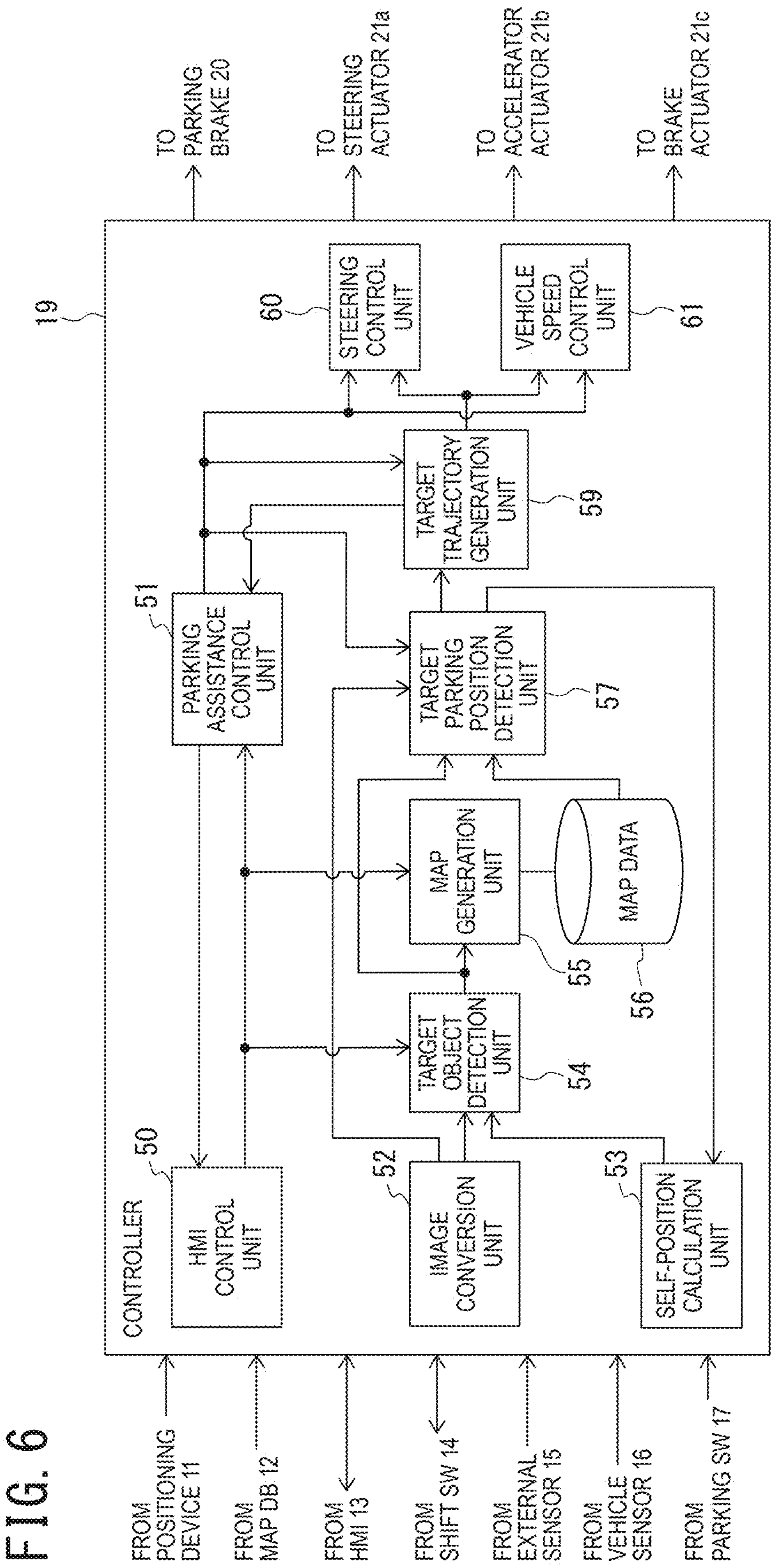
FIG. 6 is a block diagram of an example of a functional configuration of a controller in FIG. 1.

FIG. 6 is a block diagram of an example of a functional configuration of a parking assistance function performed by a controller in FIG. 1. An HMI control unit 50 detects registration operation of the parking position 31 by the user. When the parking position 31 is to be registered, the HMI control unit 50 outputs a map generation command to cause learned target object data to be stored in the storage device 19*b*, to a map generation unit 55.

An image conversion unit 52 converts a captured image captured by a camera to an overhead view image that is an image viewed from a virtual viewpoint directly above the own vehicle 1. The image conversion unit 52 generates a surrounding image that is an image depicting a surrounding region of the own vehicle 1 by converting a captured image to an overhead view image at a predetermined interval and accumulating converted overhead view images along a travel route of the own vehicle 1.

A self-position calculation unit 53 calculates a self-position that is a current position of the own vehicle 1 in the map coordinate system, based on a result of positioning of the own vehicle 1 that the positioning device 11 measured by a satellite positioning system and autonomous navigation (for example, odometry such as dead reckoning) based on vehicle information output from vehicle sensors 16.

For example, the self-position calculation unit 53 acquires an observed value Xo=(x-coordinate, y-coordinate, azimuth (yaw angle)) of the current position of the own vehicle 1 in the map coordinate system that is measured by the satellite positioning system, from the positioning device 11. In addition, the self-position calculation unit 53 acquires positioning state information that indicates a state of positioning by the satellite positioning system. For example, the positioning state information may include a mode FIX_TYPE of position information in the satellite positioning system, the number NUM of captured positioning satellites, a dilution of precision (DOP) that is an index value matching an arrangement state of captured positioning satellites, and a reception possibility signal of a satellite signal. For example, the mode FIX_TYPE is set to "NO FIX" that indicates that no position information can be obtained, "2D FIX" that indicates that two-dimensional information has been obtained, or "3D FIX" that indicates that three-dimensional information has been obtained.

The self-position calculation unit 53 sets a satellite positioning system use flag Fs that determines whether or not to make use of the position information obtained from the satellite positioning system, based on a shift position detected by the shift switch 14 and the positioning state information. When the flag Fs=True, the self-position calculation unit 53 calculates the self-position of the own vehicle 1 by the satellite positioning system and the autonomous navigation, and when the flag Fs=False, the self-position calculation unit 53 calculates the self-position of the own vehicle 1 by only the autonomous navigation. For example, the self-position calculation unit 53 may set, when a satellite signal can be received, the shift position is in a forward travel position (for instance, a drive range (D) or a brake range (B)), the number NUM of captures is greater than or equal to a capture number threshold value thNUM, and the dilution of precision DOP is less than a DOP threshold value thDOP, the satellite positioning system use flag Fs to True, and otherwise to False.

Further, the self-position calculation unit 53 acquires a detected value of vehicle speed V that is speed of the center position of a rear axle of the own vehicle 1 and a detected value of a steering angle θ of a steering wheel from the vehicle sensors 16. The self-position calculation unit 53 calculates a yaw rate γ of the own vehicle 1, based on the detected values of the vehicle speed V and steering angle θ.

The self-position calculation unit 53 calculates the self-position of the own vehicle 1, based on the above-described detected values, acquired from the vehicle sensors 16, and calculated value, the observed value Xo and the positioning state information acquired from the positioning device 11, and the satellite positioning system use flag Fs. For example, the self-position calculation unit 53 may calculate the self-position of the own vehicle 1, using an extended Kalman filter based on a rear wheel axle-based geometric model, which will be described below.

Now, a state value X_=(x-coordinate, y-coordinate, azimuth)$^T$ of the own vehicle 1 is defined as the following equations.

[Math 1]

$$X\_ = \begin{bmatrix} x + V\cos\theta\Delta T \\ y + V\sin\theta\Delta T \\ \theta + \gamma\Delta T \end{bmatrix}$$

$$F_x = \frac{\partial X\_}{\partial x} = \begin{bmatrix} 1 & 0 & -V\sin\theta\Delta T \\ 0 & 1 & V\cos\theta\Delta T \\ 0 & 0 & 1 \end{bmatrix}$$

$$F_W = \frac{\partial X\_}{\partial u} = \begin{bmatrix} \cos\theta\Delta T & 0 \\ \sin\theta\Delta T & 0 \\ 0 & \Delta T \end{bmatrix}$$

In the above equations, the variables x, y, and θ are state values of the x-coordinate, the y-coordinate, and the azimuth in the previous calculation cycle, respectively, ΔT is a calculation period of the Kalman filter, and the variable u is a vector (V,γ) having, as elements thereof, the vehicle speed V and the yaw rate γ.

Error matrices R and Q are set as the following equations. The elements r1, r2, and r3 are variances of X error, Y error, and azimuth error of the satellite positioning system, respectively, and the elements q1 and q2 are variances of errors of the vehicle speed and the yaw rate, respectively. The above-described elements r1, r2, r3, q1, and q2 are adjustment parameters that are appropriately set by design. In addition, the self-position calculation unit 53 sets a matrix C as expressed by the following equations, depending on the satellite positioning system use flag Fs.

[Math 2]

$$R = \begin{bmatrix} r1 & 0 & 0 \\ 0 & r2 & 0 \\ 0 & 0 & r3 \end{bmatrix}$$

$$Q = \begin{bmatrix} q1 & 0 \\ 0 & q2 \end{bmatrix}$$

if $Fs = \text{True}$ $$C = \begin{bmatrix} 1 & 0 & 0 \\ 0 & 1 & 0 \\ 0 & 0 & 1 \end{bmatrix}$$

if $Fs = \text{False}$ $$C = \begin{bmatrix} 0 & 0 & 0 \\ 0 & 0 & 0 \\ 0 & 0 & 0 \end{bmatrix}$$

The self-position calculation unit 53 calculates variance S of estimated values by the Kalman filter, variance S_ of predicted values, a Kalman gain K, and a self-position Xh of the own vehicle 1, using the following equations. In addition, the self-position calculation unit 53 calculates a norm Ns of the variance S and a norm Nk of the Kalman gain K.

[Math 3]

$$S = S\_ - KCS\_$$

$$S\_ = F_x S F_x + F_W Q F'_W$$

$$K = S\_C^T(CS\_C^T + R)^{-1}$$

$$Xh = X\_ + K(Xo - CX\_)$$

When the satellite positioning system use flag Fs is True (when the satellite positioning system is used), the self-position Xh is given by X_+K (Xo−CX_). That is, the self-position calculation unit 53 calculates the self-position Xh by correcting the state value X_ estimated by the autonomous navigation with the observed value Xo observed by the satellite positioning system.

In contrast, when the satellite positioning system use flag Fs is False (when the satellite positioning system is not used), the self-position Xh becomes equal to X_ since the matrix C becomes a zero matrix. That is, the self-position calculation unit 53 detects the self-position Xh, using only the autonomous navigation without using the satellite positioning system. For example, when the shift position is set to a position other than the forward travel position, the self-position calculation unit 53 detects the self-position Xh, using only the autonomous navigation without using the satellite positioning system.

In addition, when detection of the self-position by the satellite positioning system cannot be performed (for example, when no satellite signal can be received, when the number NUM of captures is less than a threshold value, or when the dilution of precision DOP is greater than or equal to a threshold value), the self-position calculation unit 53 also calculates the self-position Xh=X_, based on only the state value X_ estimated by the autonomous navigation. In this case, the self-position is calculated based on a positioning result at a past time point when the self-position was able to be detected by the satellite positioning system and subsequent use of the autonomous navigation.

A target object detection unit 54 detects a target object from a surrounding image output from the image conversion unit 52. The target object detection unit 54 may detect a position of a feature point of a target object and an image feature amount of the feature point. The target object detection unit 54 outputs the detected position and image feature amount of the feature point to the map generation unit 55 and a target parking position detection unit 57 as target object data. In addition, the target object detection unit 54 outputs the current position of the own vehicle 1 acquired from the self-position calculation unit 53 in synchronization with the detection of the target object to the map generation unit 55 and the target parking position detection unit 57.

When the map generation unit 55 receives a map generation command from the HMI control unit 50 (that is, when the registration operation of the parking position 31 is performed), the map generation unit 55 generates learned target object data and stores the generated learned target object data in the storage device **19*b* as map data 56. For example, the map generation unit 55 receives target object data and the current position of the own vehicle 1 in the map coordinate system that is synchronous with the target object data from the target object detection unit 54. The map generation unit 55 acquires position information of the parking position 31 in the map coordinate system. For example, the map generation unit 55 may acquire the current position that the self-position calculation unit 53 calculates when the own vehicle 1 is positioned at the parking position 31 as the position information of the parking position 31. The map generation unit 55 generates relative position data, based on a position of a feature point included in the target object data, position information of the own vehicle 1 synchronous with the position of the feature point, and position information of the parking position 31. The map generation unit 55 acquires feature amount data from the target object data output from the target object detection unit 54. The map generation unit 55 stores learned target object data including the above-described relative position data and feature amount data, and the position data of the parking position 31 in the storage device 19*b* as the map data 56**.

Figure 7:
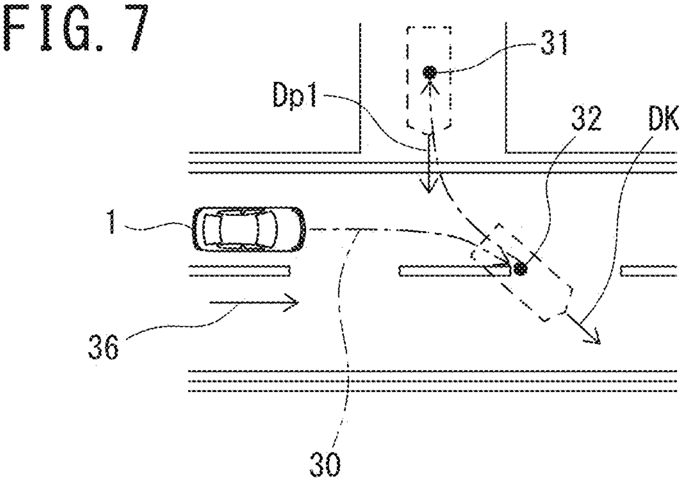
FIG. 7 is a schematic diagram of a parking position, a first parking azimuth, a maneuvering position, and a maneuvering azimuth that are registered in advance prior to the parking assistance.

FIG. 7 is now referred to. The map generation unit 55 stores, in addition to the learned target object data, position information of the maneuvering position 32, information about a first parking azimuth Dp1 that is an azimuth of the parking position 31, and information about a maneuvering azimuth Dk that is an azimuth of the own vehicle 1 at the maneuvering position 32, in the storage device **19*b* as the map data 56. The map generation unit 55 may detect an azimuth of the own vehicle 1 in a state of the own vehicle 1 being parked at the parking position 31 as the first parking azimuth Dp1**.

Further, the map generation unit 55 may store the number NUM of captured positioning satellites, the dilution of precision DOP, and estimation precision of the extended Kalman filter (for example, the norms Ns and Nk) when the own vehicle 1 is parked at the parking position 31 by manual driving to register the parking position 31, in the storage device **19*b***.

Note that as with the first embodiment, the above-described learned target object data, position information of the maneuvering position 32, first parking azimuth Dp1, maneuvering azimuth Dk, number NUM of captures, dilution of precision DOP, and estimation precision of the extended Kalman filter may be stored in a storage device external to the own vehicle 1 (for example, a cloud computer).

FIG. 6 is now referred to. A parking assistance control unit 51 executes parking assistance control to assist parking of the own vehicle 1 at the parking position 31 registered in the storage device **19*b*. The parking assistance control unit 51 can be set to an "automatic start mode" in which the parking assistance control unit 51 automatically starts a search for the parking position 31 existing in the surroundings of the own vehicle 1 and a "manual start mode" in which the parking assistance control unit 51 starts the search for the parking position 31 when an operation by the user to instruct start of the parking assistance control of the own vehicle 1 (hereinafter, sometimes referred to as "starting operation") is performed, by switching therebetween. For example, the starting operation may be an operation of a parking switch 17** by the user.

The parking assistance control unit 51 receives the self-position 33 of the own vehicle 1 from the self-position calculation unit 53 and also acquires information about the pre-registered maneuvering position 32 from the storage device 19*b*. In the automatic start mode, the parking assistance control unit 51 determines whether or not the maneuvering position 32 is located within a predetermined distance range 34 from the self-position 33. For example, the parking assistance control unit 51 determines whether or not distance D between the self-position 33 and the maneuvering position 32 is less than or equal to a distance threshold value Dth. When the maneuvering position 32 is located within the predetermined distance range 34, the parking assistance control unit 51 automatically starts the parking assistance control. In the manual start mode, the parking assistance control unit 51 determines, when having accepted a starting operation from the user, whether or not the maneuvering position 32 is located within the predetermined distance range 34 from the self-position 33, and starts, when the maneuvering position 32 is located within the predetermined distance range 34, the parking assistance control.

The parking assistance control unit 51 may change the distance threshold value Dth according to precision in detection of the self-position of the own vehicle 1. The parking assistance control unit 51 may change the distance threshold value Dth according to the precision in the detection of the self-position when the own vehicle 1 is parked at the parking position 31 by manual driving to register the parking position 31 in advance or may change the distance threshold value Dth according to the precision in the detection of the self-position when executing the parking assistance control to assist parking at the parking position 31 after the registration of the parking position 31.

For example, the parking assistance control unit 51 may switch the distance threshold value Dth depending on the precision in the detection of the self-position by the satellite positioning system. For example, the parking assistance control unit 51 may switch the distance threshold value Dth depending on possibility/impossibility of the detection of the self-position by the satellite positioning system. For example, the parking assistance control unit 51 may set the distance threshold value Dth to a first fixed value D1 when the precision in the detection of the self-position by the satellite positioning system is good. In addition, when the self-position cannot be detected by the satellite positioning system, the parking assistance control unit 51 may set the distance threshold value Dth to a second fixed value D2 that is greater than the first fixed value D1 or a value selected by the user. For example, the parking assistance control unit 51 may determine that the precision in the detection is good when the mode FIX_TYPE of the position information in the satellite positioning system is "3D FIX" or when the number NUM of captures is 6 or more and the dilution of precision DOP is less than 3. In addition, for example, when the mode FIX_TYPE is "NO FIX" or the number NUM of captures is 3 or less, the parking assistance control unit 51 may determine that the self-position cannot be detected by the satellite positioning system. Otherwise, the parking assistance control unit 51 may determine that the self-position can be detected by the satellite positioning system and the precision in the detection is poor.

In addition, for example, the parking assistance control unit 51 may change the distance threshold value Dth according to the precision in the detection of the self-position by the autonomous navigation. For example, the parking assistance control unit 51 may set the distance threshold value Dth larger when the precision in the detection of the self-position by the autonomous navigation is low than when the precision in the detection is high. For example, when the parking assistance control unit 51 determines that the self-position can be detected by the satellite positioning system and the precision in the detection is poor, the parking assistance control unit 51 may set a larger distance threshold value Dth when error in the detection by the autonomous navigation is large than when the error is small. For example, the larger the error in the detection by the autonomous navigation is, the larger distance threshold value Dth the parking assistance control unit 51 may set. For example, the parking assistance control unit 51 may set an added value ΔD that increases as the error in the detection by the autonomous navigation becomes larger, and set a sum of the first fixed value D1 and the added value ΔD as the distance threshold value Dth=D1+ΔD. The parking assistance control unit 51 may use the norm Ns of the variance S of estimated values by the Kalman filter or the norm Nk of the Kalman gain K as an indicator of the error in the detection by the autonomous navigation.

When the parking assistance control unit 51 starts a search for the parking position 31, the parking assistance control unit 51 outputs a parking position calculation command to the target parking position detection unit 57. The HMI control unit 50 may display a second guidance screen to notify that the controller 19 is searching for the parking position 31 existing in the surroundings of the own vehicle 1. FIG. 8 is a schematic diagram of an example of the second guidance screen. A second guidance screen 40*b* includes a captured image 41, an overhead view image 42, a message display area 43, and an end button 45.

FIG. 6 is now referred to. The target parking position detection unit 57 having received a parking position calculation command receives target object data output from the target object detection unit 54 as target object data of a surrounding target object and also receives the self-position of the own vehicle 1 in the map coordinate system in synchronization with the reception of the target object data.

The target parking position detection unit 57 retrieves the learned target object data and the first parking azimuth Dp1 stored in the storage device 19*b* as the map data 56, and matches a learned target object stored in the map data 56 and a surrounding target object with each other and associates the same feature points with each other. The target parking position detection unit 57 calculates a current relative position of the own vehicle 1 with respect to the parking position 31, based on a relative positional relationship between a surrounding target object and the own vehicle 1 and a relative positional relationship between a learned target object associated with the surrounding target object and the parking position 31.

For example, surrounding target objects are denoted by $(x_i,y_i)$ and learned target objects each of which is associated with one of the surrounding target objects $(x_i,y_i)$ are denoted by $(x_{mi},y_{mi})$ (i=1 to N). The target parking position detection unit 57 calculates an affine transformation matrix $M_{affine1}$, using the following equation, based on a least-square method.

[Math 4]

$$\begin{bmatrix} a_1 \\ a_2 \\ a_3 \\ a_4 \end{bmatrix} = [X_X^T \ X_X]^{-1} X_X^T X_{tfm}$$

where $$X_X = \begin{bmatrix} x_{m1} & y_{m1} & 1 & 0 \\ y_{m1} & -x_{m1} & 0 & 1 \\ \vdots & \vdots & \vdots & \vdots \\ x_{mN} & y_{mN} & 1 & 0 \\ y_{mN} & -x_{mN} & 0 & 1 \end{bmatrix}$$

$$X_{tfm} = \begin{bmatrix} x_1 \\ y_1 \\ \vdots \\ x_N \\ y_N \end{bmatrix}$$

$$M_{affine1} = \begin{bmatrix} a_1 & a_2 & a_3 \\ -a_2 & a_1 & a_4 \end{bmatrix}$$

The target parking position detection unit 57 estimates a position (targetx, targety) of the parking position 31 in the vehicle coordinate system, based on a position ($targetx_m$, $targety_m$) of the parking position 31 in the map coordinate system stored in the map data 56 and the following equation.

[Math 5]

$$\begin{Bmatrix} targetx \\ targety \end{Bmatrix} = M_{affine1} \begin{Bmatrix} targetx_m \\ targety_m \\ 1 \end{Bmatrix}$$

The target parking position detection unit 57 estimates a parking azimuth targetyaw of the parking position 31 in the vehicle coordinate system, based on the first parking azimuth Dp1 stored in the map data 56 and the following equation. The parking azimuth targetyaw indicates a relative azimuth of the parking azimuth of the parking position 31 with respect to a current azimuth of the own vehicle 1.

[Math 6]

$$targetyaw = \tan^{-1}\frac{a_2}{a_1} + Dp1$$

Figure 9:
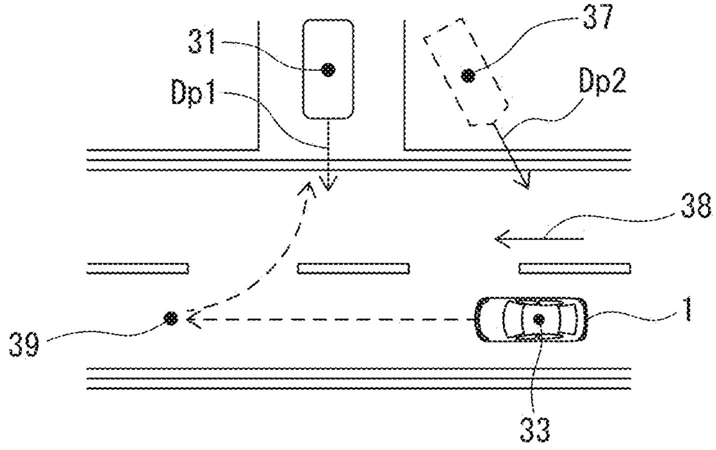
FIG. 9 is a schematic diagram of a determination method of propriety of a detected parking position.

The target parking position detection unit 57 calculates a position of the parking position 31 in the map coordinate system, based on the self-position of the own vehicle 1 calculated by the self-position calculation unit 53 and the position (targetx, targety) of the parking position 31 in the vehicle coordinate system. FIG. 9 is now referred to. A reference sign 37 indicates the position of the parking position 31 in the map coordinate system calculated by the target parking position detection unit 57. In the following description, the position of the parking position 31 in the map coordinate system calculated by the target parking position detection unit 57 is sometimes referred to as "detected position 37".

The target parking position detection unit 57 calculates a parking azimuth of the parking position 31 in the map coordinate system, based on the current azimuth of the own vehicle 1 calculated by the self-position calculation unit 53 and the above-described parking azimuth targetyaw. In the following description, the parking azimuth of the parking position 31 in the map coordinate system calculated by the target parking position detection unit 57 is sometimes referred to as "second parking azimuth Dp2".

In this configuration, there are some cases where error in detection occurs between the detected position 37 and the second parking azimuth Dp2 calculated by the target parking position detection unit 57 and the parking position 31 and the first parking azimuth Dp1 stored in the map data 56, as illustrated in FIG. 9. For example, when parking of the own vehicle 1 at the registered parking position 31 is assisted, it is assumed that the own vehicle 1 moves forward in the direction of an arrow 38, comes close to a maneuvering position 39, and after reaching the maneuvering position 39, reaches the parking position 31 in reverse travel. On the other hand, when the parking position 31 is to be registered, it is assumed that the own vehicle 1 moves forward in the direction of the arrow 36 and comes close to the maneuvering position 32, as illustrated in FIGS. 5A and 7.

As described above, there are some cases where when a direction in which the own vehicle 1 moves forward towards a maneuvering position when the parking position 31 is to be registered and a direction in which the own vehicle 1 moves forward toward a maneuvering position when the parking of the own vehicle 1 at the registered parking position 31 is assisted are opposite directions to each other, error in detection occurs between the detected position 37 calculated by the target parking position detection unit 57 and the parking position 31 stored in the map data 56 and between the second parking azimuth Dp2 and the first parking azimuth Dp1. In addition, there are some cases where error in detection occurs due to error in positioning by the positioning device 11 or the self-position calculation unit 53 or error in matching between a learned target object and a surrounding target object.

Therefore, the parking assistance control unit 51 determines propriety of the relative position of the parking position 31 calculated by the target parking position detection unit 57, based on the relative position of the parking position 31 with respect to the own vehicle 1 (that is, the position (targetx, targety) of the parking position 31 in the vehicle coordinate system) calculated by the target parking position detection unit 57 and an azimuth difference $\Delta\theta$ between the first parking azimuth Dp1 and the second parking azimuth Dp2. For example, the parking assistance control unit 51 determines that the relative position of the parking position 31 calculated by the target parking position detection unit 57 is proper when the relative position of the parking position 31 calculated by the target parking position detection unit 57 is located within a range of a predetermined distance from the own vehicle 1 and the azimuth difference $\Delta\theta$ is less than or equal to a threshold value, and determines that the relative position of the parking position 31 calculated by the target parking position detection unit 57 is not proper when the relative position of the parking position 31 calculated by the target parking position detection unit 57 is not located within the range of the predetermined distance from the own vehicle 1 or the azimuth difference $\Delta\theta$ is greater than the threshold value.

Note that the parking assistance control unit 51 may determine that the relative position of the parking position 31 calculated by the target parking position detection unit 57 is proper when an azimuth difference between the current azimuth of the own vehicle 1 and the maneuvering azimuth Dk stored in the storage device 19*b* is less than or equal to a threshold value, and determine that the relative position is not proper when the azimuth difference is greater than the threshold value.

When the parking assistance control unit 51 determines that the relative position of the parking position 31 calculated by the target parking position detection unit 57 is proper, the HMI control unit 50 may display a first guidance screen 40*a* illustrated in FIG. 3 on a display device in HMIs 13. On the other hand, when the parking assistance control unit 51 determines that the relative position of the parking position 31 calculated by the target parking position detection unit 57 is not proper, the HMI control unit 50 may display, for example, an error message indicating that the parking position cannot be found on an HMI 13 and the parking assistance control may be terminated.

When a parking start button 44 is operated in the first guidance screen 40*a*, the parking position 31 is set as the target parking position and the assistance in parking of the own vehicle 1 at the target parking position is started. A target trajectory generation unit 59 calculates a target parking route starting from the current position of the own vehicle 1 and reaching the parking position 31. The target trajectory generation unit 59 calculates a target vehicle speed profile that is a target value of vehicle speed of the own vehicle 1 on the target parking route. A steering control unit 60 controls a steering actuator 21*a* in such a way that the own vehicle 1 travels along the target parking route. A vehicle speed control unit 61 controls an accelerator actuator 21*b* and a brake actuator 21*c* in such a way that the vehicle speed of the own vehicle 1 changes in accordance with the target vehicle speed profile. When the own vehicle 1 reaches the target parking position and the parking assistance control is completed, the parking assistance control unit 51 causes a parking brake 20 to operate and switches the shift position to a parking range.

Figure 10:
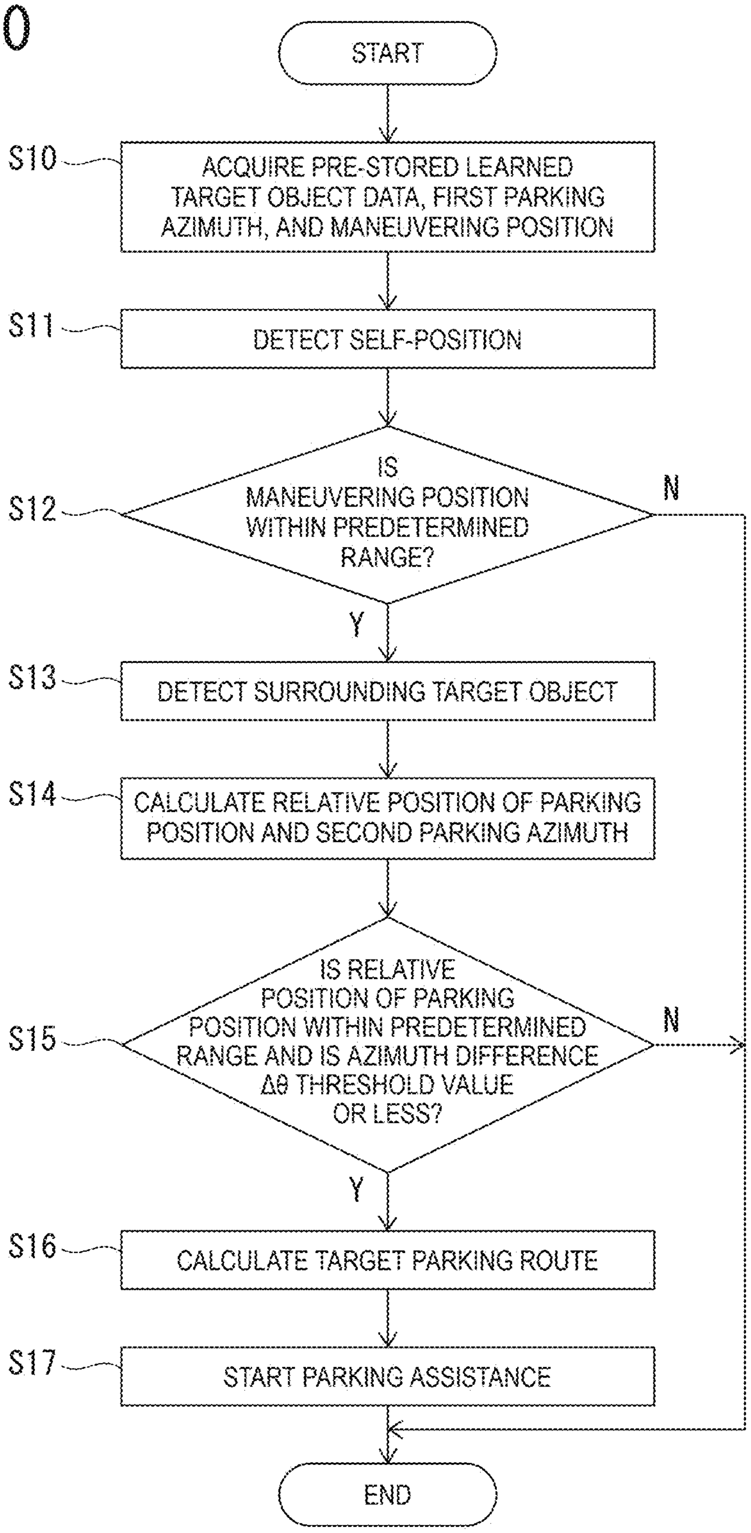
FIG. 10 is a flowchart of a parking assistance method of a second embodiment.

FIG. 10 is a flowchart of a parking assistance method of the second embodiment. In step S10, the controller 19 acquires a pre-stored learned target object data, first parking azimuth Dp1, and maneuvering position 32 from the storage device 19*b*. In step S11, the controller 19 detects a self-position 33. In step S12, the controller 19 determines whether or not the maneuvering position 32 is located within a predetermined distance range 34 from the self-position 33. When the maneuvering position 32 is located within the predetermined distance range 34 (step S12: Y), the process proceeds to step S13. When the maneuvering position 32 is not located within the predetermined distance range 34 (step S12: N), the process terminates without displaying guidance of the parking position 31. In this case, the controller 19 does not execute parking assistance of the own vehicle 1 at the target parking position. In step S13, the controller 19 detects a surrounding target object. In step S14, the controller 19 calculates a relative position of the parking position 31 with respect to the own vehicle 1 and a second parking azimuth Dp2.

In step S15, the controller 19 determines whether or not the relative position of the parking position 31 is located within a predetermined distance range from the own vehicle 1 and an azimuth difference Δθ between the first parking azimuth Dp1 and the second parking azimuth Dp2 is less than or equal to a threshold value. When the relative position of the parking position 31 is located within a predetermined distance range from the own vehicle 1 and the azimuth difference Δθ is less than or equal to the threshold value (step S15: Y), the process proceeds to step S16. When the relative position of the parking position 31 is not located within the predetermined distance range from the own vehicle 1 or the azimuth difference Δθ is greater than the threshold value (step S15: N), the process terminates without displaying the guidance of the parking position 31. In this case, the controller 19 does not execute parking assistance of the own vehicle 1 at the target parking position.

In step S16, the controller 19 displays the first guidance screen 40*a* on the display device in the HMIs 13. The controller 19 calculates a target parking route starting from the current position of the own vehicle 1 and reaching the parking position 31. In step S17, the controller 19 performs the parking assistance control of the own vehicle 1, based on the calculated target parking route. Subsequently, the process terminates.

Advantageous Effects of Embodiments (1) A controller 19: acquires, from a storage device, the storage device storing, when parking is performed in advance, information about a parking position when parking is performed and information about a maneuvering position, the maneuvering position being a position at which when a vehicle is parked at the parking position, the vehicle changes its direction of travel back and forth, information about the parking position and the maneuvering position; detects a self-position, the self-position being a current position of an own vehicle 1; and informs, based on the maneuvering position and the self-position, a user of the own vehicle 1 of the parking position as a target parking position candidate. Because of this configuration, it is possible to automatically inform the parking position when the own vehicle 1 comes close to the pre-registered parking position. As a result, it is possible to save labor in selection operation of a parking position by the user when guidance of the pre-stored target position is presented to the user.

(2) The controller 19 may inform, when distance between the self-position and the maneuvering position is less than or equal to a distance threshold value, the parking position. Because of this configuration, it is possible to determine whether or not the own vehicle 1 has come close to the pre-registered parking position.

(3) The controller 19 may change the distance threshold value according to precision in detection of the self-position. Because of this configuration, it is possible to detect a pre-registered parking position even at a place where the precision in the detection of the self-position is low.

(4) The controller 19 may detect the self-position by a satellite positioning system and set the distance threshold value according to at least one of a number and an arrangement state of the captured positioning satellites. Because of this configuration, it is possible to change the distance threshold value according to the precision in the detection of the self-position when the self-position is detected by the satellite positioning system.

(5) The controller 19 may set the distance threshold value larger when precision in detection of the self-position by autonomous navigation is low than when the precision is high. Because of this configuration, it is possible to change the distance threshold value according to the precision in the detection of the self-position when the self-position is detected by the autonomous navigation.

(6) The controller 19 may: acquire, from the storage device having stored data representing a relative positional relationship between a target object existing in surroundings of the parking position and the parking position as learned target object data, the learned target object data; detect a position of a surrounding target object, the surrounding target object being a target object existing in surroundings of the own vehicle; calculate a relative positional relationship between the parking position and the self-position, based on the learned target object data and a position of the surrounding target object; and calculate a travel trajectory starting from the self-position and reaching the parking position, based on the calculated relative positional relationship and assist, when the parking position is set as a target parking position, parking of the own vehicle 1 at the target parking position, based on the travel trajectory. Because of this configuration, the user can use parking assistance control to assist parking of the own vehicle 1 at a pre-registered parking position.

(7) The controller 19 may: acquire, from the storage device having stored information about a parking azimuth, the parking azimuth being an azimuth of the vehicle in a state of being parked at the parking position, in advance, information about the parking azimuth and estimate a relative azimuth of the parking azimuth with respect to a current azimuth of the own vehicle, based on the learned target object data, a position of the surrounding target object, and the parking azimuth; detect a current azimuth of the own vehicle 1; and determine whether or not to assist parking of the own vehicle 1 at the target parking position, based on a difference between the parking azimuth estimated based on the current azimuth and the relative azimuth and the parking azimuth acquired from the storage device. Because of this configuration, it is possible to determine whether or not the relative position of the parking position calculated based on the learned target object data and the position of a surrounding target object is proper.

(8) The controller 19 may: acquire, from the storage device having stored information about a maneuvering azimuth, the maneuvering azimuth being an azimuth of the vehicle at the maneuvering position, in advance, information about the maneuvering azimuth; detect a current azimuth of the own vehicle 1; and determine whether or not to assist parking of the own vehicle 1 at the target parking position, based on a difference between the current azimuth and the maneuvering azimuth. Because of this configuration, it is possible to determine whether or not the relative position of the parking position calculated based on the learned target object data and the position of a surrounding target object is proper.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
10 Parking assistance device
11 Positioning device
12 Map database
13 Human-machine interface
14 Shift switch
15 External sensor
16 Vehicle sensor
17 Parking switch
19 Controller
19*a* Processor
19*b* Storage device
20 Parking brake
21*a* Steering actuator
21*b* Accelerator actuator
21*c* Brake actuator
50 HMI control unit
51 Parking assistance control unit
52 Image conversion unit
53 Self-position calculation unit
54 Target object detection unit
55 Map generation unit
56 Map data
57 Target parking position detection unit
59 Target trajectory generation unit
60 Steering control unit
61 Vehicle speed control unit

The invention claimed is:

1. A parking assistance method comprising:

acquiring, from a storage device, the storage device storing, when parking is performed in advance, information about a parking position when parking is performed and information about a maneuvering position, the maneuvering position being a position at which when a vehicle is parked at the parking position, the vehicle changes its direction of travel back and forth, information about the parking position and the maneuvering position;

detecting a self-position, the self-position being a current position of an own vehicle; and informing, based on the maneuvering position and the self-position, a user of the own vehicle of the parking position as a target parking position candidate.

2. The parking assistance method according to claim 1, wherein when distance between the self-position and the maneuvering position is less than or equal to a distance threshold value, the parking assistance method informs the parking position.

3. The parking assistance method according to claim 2 comprising changing the distance threshold value according to precision in detection of the self-position.

4. The parking assistance method according to claim 3, wherein the parking assistance method detects the self-position by a satellite positioning system and sets the distance threshold value according to at least one of a number and an arrangement state of the captured positioning satellites.

5. The parking assistance method according to claim 3, wherein the parking assistance method sets the distance threshold value larger when precision in detection of the self-position by autonomous navigation is low than when the precision is high.

6. The parking assistance method according to claim 1 comprising:

acquiring, from the storage device having stored data representing a relative positional relationship between a target object existing in surroundings of the parking position and the parking position as learned target object data, the learned target object data;

detecting a position of a surrounding target object, the surrounding target object being a target object existing in surroundings of the own vehicle;

calculating a relative positional relationship between the parking position and the self-position, based on the learned target object data and a position of the surrounding target object; and calculating a travel trajectory starting from the self-position and reaching the parking position, based on the calculated relative positional relationship and assisting, when the parking position is set as a target parking position, parking of the own vehicle at the target parking position, based on the travel trajectory.

7. The parking assistance method according to claim 6 comprising:

acquiring, from the storage device having stored information about a parking azimuth, the parking azimuth being an azimuth of the vehicle in a state of being parked at the parking position, in advance, information about the parking azimuth and estimating a relative azimuth of the parking azimuth with respect to a current azimuth of the own vehicle, based on the learned target object data, a position of the surrounding target object, and the parking azimuth;

detecting a current azimuth of the own vehicle; and determining whether or not to assist parking of the own vehicle at the target parking position, based on a difference between the parking azimuth estimated based on the current azimuth and the relative azimuth and the parking azimuth acquired from the storage device.

8. The parking assistance method according to claim 6 comprising:

acquiring, from the storage device having stored information about a maneuvering azimuth, the maneuvering azimuth being an azimuth of the vehicle at the maneuvering position, in advance, information about the maneuvering azimuth;

detecting a current azimuth of the own vehicle; and determining whether or not to assist parking of the own vehicle at the target parking position, based on a difference between the current azimuth and the maneuvering azimuth.

9. A parking assistance device including a controller configured to execute processing comprising:

acquiring, from a storage device, the storage device storing, when parking is performed in advance, information about a parking position when parking is performed and information about a maneuvering position, the maneuvering position being a position at which when a vehicle is parked at the parking position, the vehicle changes its direction of travel back and forth, information about the parking position and the maneuvering position;

detecting a self-position, the self-position being a current position of an own vehicle; and informing, based on the maneuvering position and the self-position, a user of the own vehicle of the parking position as a target parking position candidate.

* * * * *